UNITED STATES PATENT OFFICE.

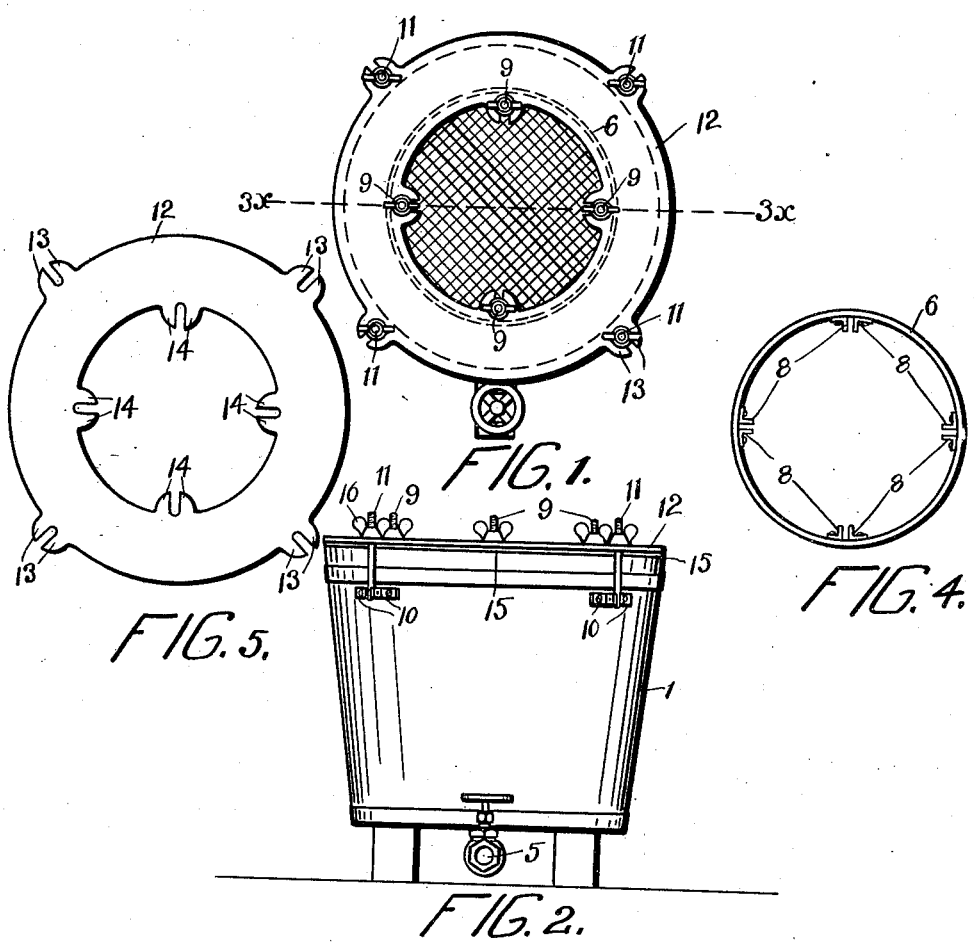
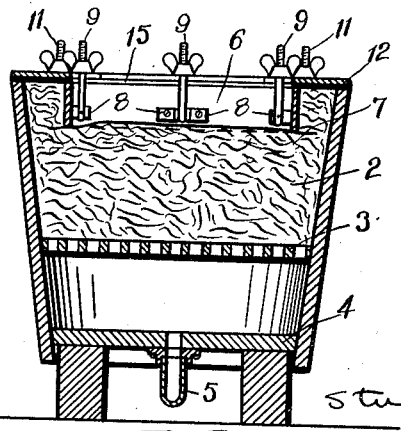

STUART L. CRAWFORD, OF ROCHESTER, NEW YORK.

FILTER.

1,088,011.     Specification of Letters Patent.     Patented Feb. 24, 1914.

Application filed January 28, 1913. Serial No. 744,750.

*To all whom it may concern:*

Be it known that I, STUART L. CRAWFORD, a citizen of the United States, residing at Rochester, in the county of Monroe and State of New York, have invented certain new and useful Improvements in Filters, of which the following is a specification.

The object of my invention is to provide a new and improved and cheap form of filter.

Another object of my invention is to arrange the filter so as to simplify the packing thereof.

Another object of my invention is to arrange the filter so that the liquid to be filtered cannot pass therethrough without passing through the filtering material, thus preventing the liquid from escaping from the filter by passing between the filter material and casing.

Another object of my invention is to arrange the filter so as to facilitate the cleaning thereof.

Another object of my invention is to arrange the filter so that it may be easily operated in connection with a vacuum or partial vacuum.

These and other objects of my invention will be fully illustrated in the drawings, described in the specification and pointed out in the claims at the end thereof.

In the accompanying drawings, Figure 1 is a top plan view of the filter. Fig. 2 is a side elevation of the filter. Fig. 3 is a sectional elevation of the filter, the section being taken on the line $3^x$—$3^x$ in Fig. 1. Fig. 4 is a detail plan view of the inner partition or packing ring of the filter. Fig. 5 is a detail view of the top plate of the filter, which may be used to prevent air leakage around the packing ring.

In the accompanying drawings like reference numerals refer to like parts.

In the drawings reference numeral 1 indicates the filter tank in which the process of filtering may conveniently be carried on.

2 is the packing material with which the filtering tank may be filled, which packing material may be of any form of cotton or any other equivalent substance or filtering material.

Reference numeral 3 is the false bottom which is placed at a suitable distance from the real bottom 4 of the filtering tank. In the real bottom 4 is placed the drainage pipe 5 through which the pump operates by suction to draw the liquid through the filter. In the top of the filter is placed a partition or packing ring 6. The filter is prepared by filling the filtering tank with the cotton or other filtering material to the level indicated in Fig. 3. Then the partition or packing ring 6 is placed on top of the filtering material and the filtering material is then filled in around the ring, so that all of the filtering tank above the false bottom is filled with the filtering material except the inside of the ring 6.

A layer of burlap or other cloth 7 may be placed on top of the pulp below the partition ring to hold it in place, and a similar layer may be placed on top of the false bottom 3 or between the false bottom and the filtering material. The arrangement of the filtering material and the partition ring is such that it will prevent the fluid that is to be filtered from readily coming into contact with the inner sides of the tank, in which case some of the fluid would flow down the sides of the tank and would not pass through the filtering material, and would therefore not be filtered. The arrangement of the parts is to compel the liquid to be filtered to pass through the filtering material.

The partition ring 6 is provided at suitable intervals with the lugs or ears 8 which are arranged in pairs, between which are pivoted the bolts 9. These bolts are free to swing and are used for a purpose that will presently be described. On the outside of the filtering tank are provided similar ears 10, 10 arranged in pairs, between which are pivoted the bolts 11.

In connection with the filter also may be provided the packing plate 12, which plate is provided with lugs 13 arranged in pairs at suitable intervals around the exterior and lugs 14 arranged at suitable intervals around the interior thereof. The plate 12 is made preferably of metal and is provided on its under side with a layer of packing material 15, such as rubber or other equivalent material, forming a gasket between the plate and the filtering tank.

The parts may be assembled as follows: First the filtering material is placed inside of the tank, forming a layer of a suitable depth or thickness. Then the partition ring is put on top thereof and the space between the partition ring and the filtering tank is filled in with additional filtering material. Then the cover plate is placed in position on top of the partition ring and is drawn down on the partition ring by placing the bolts 9 in engagement with the lugs 14 and by tightening the thumb nuts down thereon. Then the bolts 11 may be placed in engagement with the lugs 13 on the cover plate and the thumb nuts may be tightened, drawing the cover plate down on the filtering tank and in turn drawing the partition ring down more firmly upon the filtering material. In this way a substantially air tight joint is formed between the cover plate, the filter casing and the partition ring, and a tight filtering joint is made between the partition ring and the filtering material. The partition ring may now be filled with the liquid that is to be passed through the filter. The partition ring forms a cup or receptacle to hold the liquid that is to be filtered and the vacuum may be created below the filter by means of the drainage pipe 5. The normal air pressure will then be developed more or less upon the liquid that is contained within the partition ring, which liquid will be drawn down through the filtering material 2 until it passes through the false bottom 3. It will now be seen that the liquid cannot get into contact with the side of the filtering tank without going through the filtering material, as the liquid is only contained in the receptacle 6 and can only pass from that through the bottom into the filtering material. Furthermore, it will be seen that the air cannot enter the filtering tank except through the partition ring 6 as long as the top plate 12 is securely clamped in place, and as long as the top plate is securely fastened in place and the partition ring is kept filled with the liquid to be filtered, no air can pass through the filter.

It will be understood that if desired the top plate may be omitted and the filter may be used without it, but the efficiency of it will be somewhat less due to the possibility of the leakage of air. It will also be understood that by closing the valve at the bottom of the filter, the process of filtering may be stopped indefinitely, leaving the apparatus in condition so that the process may be resumed at once by simply opening the valve.

I claim:

1. In a filter, the combination with a tank having a perforated bottom and suitable filtering material, of an unfiltered liquid reservoir within the tank and comprising a member of less diameter than the tank, said member being open at top and bottom and inclosing a space of substantial capacity, and said member being presented edgewise to the filtering material having its under edge forcibly compacting the material immediately thereunder to form a close joint which will resist the lateral flow of the liquid, said filtering material extending outside the member above the lower edge thereof, and substantially occupying the space between the exterior of the member and the inner side wall of the tank.

2. In a filter, the combination with a tank having a perforated bottom and suitable filtering material, of an unfiltered liquid reservoir within the tank and comprising a member of less diameter than the tank, said member being open at top and bottom and inclosing a space of substantial capacity, and said member being presented edgewise to the filtering material, and means for holding said member with its bottom edge forcibly compressing the filtering matter immediately thereunder whereby a close joint is formed to resist the lateral flow of the liquid, said filtering material extending outside the member above the lower edge thereof, and substantially filling the space between the exterior of the member and the inner side wall of the tank.

3. In a filter, the combination of a tank, a perforated bottom therein, filtering material placed thereon, a ring placed on top of said filtering material and surrounded by filtering material placed between said ring and the filtering tank, an annular shaped plate having a gasket thereon, means for drawing said plate down tight on top of the filtering tank, and means for drawing the partition ring up tight against said plate.

4. In a filter, the combination of a tank, a perforated bottom therein, filtering material placed thereon, a ring placed on top of said filtering material and surrounded by filtering material placed between said ring and the filtering tank, an annular cover plate for said filter, said cover plate having a series of lugs on the inner and outer edge thereof arranged in pairs at suitable intervals, bolts pivotally mounted upon the outside of the filtering tank and upon the inside of the partition ring, capable of engaging with said lugs, nuts for engaging with said bolts to draw said plate down on the filtering tank and to draw the partition up against said plate.

5. In a filter, the combination of a tank, a perforated bottom therein, filtering material supported on said bottom, a ring within the tank sunken into the top of the filtering material and confining a portion of said material between the outside of the ring and the inner wall of the tank, and a removable closure for the tank, said ring being separable from the tank and closure and having an upper edge disposed adjacent the underside of the closure, and means coacting with the closure and ring for sealing the joint therebetween.

In testimony whereof I affix my signature in presence of two witnesses.

STUART L. CRAWFORD.

Witnesses:
 LENA M. ASH,
 ERIC ISCHINGER.

Copies of this patent may be obtained for five cents each, by addressing the "Commissioner of Patents, Washington, D. C."